(12) United States Patent
Li

(10) Patent No.: US 10,579,915 B2
(45) Date of Patent: Mar. 3, 2020

(54) METHOD AND DEVICE FOR INITIALIZING TWO-DIMENSIONAL CODE

(71) Applicant: ALIBABA GROUP HOLDING LIMITED, Grand Cayman (KY)

(72) Inventor: Yin Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/045,532

(22) Filed: Jul. 25, 2018

(65) Prior Publication Data

US 2018/0341843 A1   Nov. 29, 2018

Related U.S. Application Data

(63) Continuation of application No. PCT/CN2017/071549, filed on Jan. 18, 2017.

(30) Foreign Application Priority Data

Jan. 28, 2016  (CN) .......................... 2016 1 0060058

(51) Int. Cl.
   *G06K 19/06*   (2006.01)

(52) U.S. Cl.
   CPC .............................. *G06K 19/06037* (2013.01)

(58) Field of Classification Search
   None
   See application file for complete search history.

(56) References Cited

U.S. PATENT DOCUMENTS

| | | |
|---|---|---|
| 6,310,988 B1 | 10/2001 | Flores et al. |
| 7,176,896 B1 | 2/2007 | Fahraeus et al. |
| 8,284,988 B2 | 10/2012 | Sones et al. |
| 8,833,654 B1 | 9/2014 | Grant |
| 8,887,990 B2 * | 11/2014 | Grant ..................... G06Q 50/02 235/375 |

(Continued)

FOREIGN PATENT DOCUMENTS

| | | |
|---|---|---|
| CN | 101261571 A | 9/2008 |
| CN | 101944187 A | 1/2011 |

(Continued)

OTHER PUBLICATIONS

International Search Report and Written Opinion for Application No. PCT/CN2017/071549, dated Apr. 21, 2017, 9 pages.

(Continued)

*Primary Examiner* — Kristy A Haupt

(57) ABSTRACT

A two-dimensional code initialization method includes: receiving information about any two-dimensional code, and determining, according to a preset correspondence between a name of a goods batch and information about the two-dimensional code, a name of a goods batch corresponding to the information about the two-dimensional code; determining, according to the name of the goods batch corresponding to the information about the two-dimensional code, information about a plurality of two-dimensional codes corresponding to the name of the goods batch; and associating the information about the plurality of two-dimensional codes with a URL in which goods information is written and that corresponds to the name of the goods batch corresponding to the information about the two-dimensional code.

20 Claims, 7 Drawing Sheets

(56) References Cited

U.S. PATENT DOCUMENTS

| | | |
|---|---|---|
| 2003/0165799 A1 | 9/2003 | Bisogno |
| 2003/0171944 A1 | 9/2003 | Fine et al. |
| 2005/0075900 A1 | 4/2005 | Arguimbau, III |
| 2005/0113649 A1 | 5/2005 | Bergantino |
| 2005/0206586 A1 | 9/2005 | Capurso et al. |
| 2005/0236492 A1 | 10/2005 | Ladas et al. |
| 2006/0022059 A1 | 2/2006 | Juds |
| 2006/0239505 A1 | 10/2006 | Bjorklund et al. |
| 2007/0022045 A1 | 1/2007 | Lapstun et al. |
| 2007/0272750 A1 | 11/2007 | Bjorklund |
| 2008/0049268 A1 | 2/2008 | Hardy et al. |
| 2011/0098026 A1 | 4/2011 | Uland |
| 2012/0037697 A1 | 2/2012 | Boone et al. |
| 2012/0084119 A1 | 4/2012 | Vandehey et al. |
| 2012/0280042 A1 | 11/2012 | Grant et al. |

FOREIGN PATENT DOCUMENTS

| | | |
|---|---|---|
| CN | 102930440 A | 2/2013 |
| CN | 103955835 A | 7/2014 |
| CN | 104517164 A | 4/2015 |
| CN | 105260848 A | 1/2016 |
| JP | 2007-328772 A | 12/2007 |

OTHER PUBLICATIONS

International Preliminary Report on Patentability for international Application No. PCT/CN2017/071549 dated Jul. 31, 2018, 10 pages.

First Office Action and First Search for Chinese Patent Application No. 201610060058.4 dated May 7, 2019, 6 pages.

Second Office Action for Chinese Patent Application No. 201610060058.4 dated May 28, 2019, 5 pages.

Extended European Search Report for European Application No. 17743628.4 dated Jul. 26, 2019 (7 pages).

First Office Action for Japanese Application No. 2018-539411 dated Aug. 20, 2019 (5 pages).

\* cited by examiner

Batch name

XXX goods 2015-11-18

Associate a starting two-dimensional barcode

Scan the code

Batch name

XXX goods 2015-11-18

Entire-volume association

Ending two-dimensional barcode-specified association

FIG. 5

METHOD AND DEVICE FOR INITIALIZING TWO-DIMENSIONAL CODE

CROSS REFERENCE TO RELATED APPLICATIONS

The present application is a continuation application of International Patent Application No. PCT/CN2017/071549, filed on Jan. 18, 2017, which claims priority to Chinese Patent Application No. 201610060058.4, filed on Jan. 28, 2016. The above-referenced applications are incorporated herein by reference in their entirety.

TECHNICAL FIELD

This application relates to the field of information technologies, and in particular, to a two-dimensional code initialization method and device.

BACKGROUND

Two-dimensional code initialization solutions in current technologies have issues of establishing correspondence for two-dimensional codes and low management efficiency. Two-dimensional codes applied for by a two-dimensional code user side may be applied to a plurality of goods batches. Therefore, it cannot be determined only based on appearance which goods batch the two-dimensional codes corresponding to a background database are applied to. To prevent the problem of skipping initialization or mistaken initialization, when a two-dimensional code initialization is performed, two-dimensional codes of goods of which written information has been verified need to be scanned one by one by using a code scanning device. After a physical two-dimensional code is determined to be consistent with information recorded in the background database, the two-dimensional code is associated with a URL (Uniform Resource Locator) in which related goods information is written. Thus, if a goods batch has a relatively large quantity of goods, work efficiency of the two-dimensional code initialization completed by one-by-one scanning is relatively low.

SUMMARY

Embodiments of this application provide a two-dimensional code initialization method and apparatus, to increase two-dimensional code initialization efficiency.

According to one aspect, a two-dimensional code initialization method provided in an embodiment of this application includes: receiving information about a two-dimensional code, and determining, according to a preset correspondence between a name of a goods batch and information about the two-dimensional code, a name of a goods batch corresponding to the information about the two-dimensional code; determining, according to the name of the goods batch corresponding to the information about the two-dimensional code, information about a plurality of two-dimensional codes corresponding to the name of the goods batch; and associating the information about the plurality of two-dimensional codes with a URL in which goods information is written and that corresponds to the name of the goods batch corresponding to the information about the two-dimensional code.

According to the method, information about a two-dimensional code is received, and a name of a goods batch corresponding to the information about the two-dimensional code is determined according to a preset correspondence between a name of a goods batch and information about the two-dimensional code; information about a plurality of two-dimensional codes corresponding to the name of the goods batch is determined according to the name of the goods batch corresponding to the information about the two-dimensional code; and the information about the plurality of two-dimensional codes is associated with a URL in which goods information is written and that corresponds to the name of the goods batch corresponding to the information about the two-dimensional code. Therefore, information about a plurality of two-dimensional codes corresponding to one goods batch can be associated once with a corresponding URL by using the goods batch as a unit. Compared with an operation of initializing two-dimensional codes one by one in the prior art, the method greatly increases two-dimensional code initialization efficiency.

Optionally, the correspondence between the name of the goods batch and the information about the two-dimensional code is preset in the following manner: receiving a name that is of the goods batch and that is entered by a user; receiving information that is about a starting two-dimensional code in a volume of two-dimensional codes and that is entered by the user; outputting an association manner for the user to select; and when an association manner selected by the user is entire-volume association, determining a sequence number of another two-dimensional code in the volume in accordance with a preset sequence number allocation rule of the two-dimensional codes in the volume and in accordance with a sequence number of the starting two-dimensional code, determining information about the another two-dimensional code in the volume in accordance with a preset correspondence between a sequence number of a two-dimensional code and information about the two-dimensional code and in accordance with the sequence number of the another two-dimensional code in the volume, and establishing a correspondence between the goods batch and information about all two-dimensional codes in the volume.

Optionally, the correspondence between the name of the goods batch and the information about the two-dimensional code is preset in the following manner: receiving a name that is of the goods batch and that is entered by a user; receiving information that is about a starting two-dimensional code in a volume of two-dimensional codes and that is entered by the user; outputting an association manner for the user to select; and when an association manner selected by the user is partial association inside the volume, receiving information that is about an ending two-dimensional code in the volume of two-dimensional codes and that is entered by the user, determining a sequence number of a two-dimensional code between the starting two-dimensional code and the ending two-dimensional code in the volume in accordance with a preset sequence number allocation rule of the two-dimensional codes in the volume and in accordance with a sequence number of the starting two-dimensional code, determining information about the two-dimensional code between the starting two-dimensional code and the ending two-dimensional code in the volume in accordance with a preset correspondence between a sequence number of a two-dimensional code and information about the two-dimensional code and in accordance with the sequence number of the two-dimensional code between the starting two-dimensional code and the ending two-dimensional code in the volume, and establishing a correspondence between the goods batch and information about the starting two-dimensional code to the ending two-dimensional code in the volume.

Optionally, each volume includes a same quantity of two-dimensional codes.

Optionally, sequence numbers of two-dimensional codes in each volume are consecutive.

Optionally, the method further includes: associating, according to an instruction of a user, the received information about the two-dimensional code with a URL of which goods information is blank, or with a page that has information prompting that goods information is erroneous.

According to another aspect, a two-dimensional code initialization apparatus provided in an embodiment of this application includes: a first unit, configured to: receive information about a two-dimensional code, and determine, according to a preset correspondence between a name of a goods batch and information about the two-dimensional code, a name of a goods batch corresponding to the information about the two-dimensional code; a second unit, configured to determine, according to the name of the goods batch corresponding to the information about the two-dimensional code, information about a plurality of two-dimensional codes corresponding to the name of the goods batch; and a third unit, configured to associate the information about the plurality of two-dimensional codes with a URL in which goods information is written and that corresponds to the name of the goods batch corresponding to the information about the two-dimensional code.

Optionally, the first unit presets the correspondence between the name of the goods batch and the information about the two-dimensional code in the following manner: receiving a name that is of the goods batch and that is entered by a user; receiving information that is about a starting two-dimensional code in a volume of two-dimensional codes and that is entered by the user; outputting an association manner for the user to select; and when an association manner selected by the user is entire-volume association, determining a sequence number of another two-dimensional code in the volume in accordance with a preset sequence number allocation rule of the two-dimensional codes in the volume and in accordance with a sequence number of the starting two-dimensional code, determining information about the another two-dimensional code in the volume in accordance with a preset correspondence between a sequence number of a two-dimensional code and information about the two-dimensional code and in accordance with the sequence number of the another two-dimensional code in the volume, and establishing a correspondence between the goods batch and information about all two-dimensional codes in the volume.

Optionally, the first unit presets the correspondence between the name of the goods batch and the information about the two-dimensional code in the following manner: receiving a name that is of the goods batch and that is entered by a user; receiving information that is about a starting two-dimensional code in a volume of two-dimensional codes and that is entered by the user; outputting an association manner for the user to select; and when an association manner selected by the user is partial association inside the volume, receiving information that is about an ending two-dimensional code in the volume of two-dimensional codes and that is entered by the user, determining a sequence number of a two-dimensional code between the starting two-dimensional code and the ending two-dimensional code in the volume in accordance with a preset sequence number allocation rule of the two-dimensional codes in the volume and in accordance with a sequence number of the starting two-dimensional code, determining information about the two-dimensional code between the starting two-dimensional code and the ending two-dimensional code in the volume in accordance with a preset correspondence between a sequence number of a two-dimensional code and information about the two-dimensional code and in accordance with the sequence number of the two-dimensional code between the starting two-dimensional code and the ending two-dimensional code in the volume, and establishing a correspondence between the goods batch and information about the starting two-dimensional code to the ending two-dimensional code in the volume.

Optionally, each volume includes a same quantity of two-dimensional codes.

Optionally, sequence numbers of two-dimensional codes in each volume are consecutive.

Optionally, the third unit is further configured to associate, according to an instruction of a user, the received information about the two-dimensional code with a URL of which goods information is blank, or with a page that has information prompting that goods information is erroneous.

According to another aspect, a non-transitory computer-readable storage medium comprises instructions that, when executed by a processor, cause the processor to perform a two-dimensional code initialization method, the method comprising: receiving information about a two-dimensional code, and determining, according to a preset correspondence between a name of a goods batch and information about the two-dimensional code, a name of a goods batch corresponding to the information about the two-dimensional code; determining, according to the name of the goods batch corresponding to the information about the two-dimensional code, information about a plurality of two-dimensional codes corresponding to the name of the goods batch; and associating the information about the plurality of two-dimensional codes with a URL (Uniform Resource Locator) in which goods information is written and that corresponds to the name of the goods batch corresponding to the information about the two-dimensional code.

According to another aspect, a two-dimensional code initialization system comprises a processor and a non-transitory computer-readable storage medium comprising instructions that, when executed by the processor, cause the processor to perform a two-dimensional code initialization method, the method comprising: receiving information about a two-dimensional code, and determining, according to a preset correspondence between a name of a goods batch and information about the two-dimensional code, a name of a goods batch corresponding to the information about the two-dimensional code; determining, according to the name of the goods batch corresponding to the information about the two-dimensional code, information about a plurality of two-dimensional codes corresponding to the name of the goods batch; and associating the information about the plurality of two-dimensional codes with a URL (Uniform Resource Locator) in which goods information is written and that corresponds to the name of the goods batch corresponding to the information about the two-dimensional code.

BRIEF DESCRIPTION OF THE DRAWINGS

FIG. 5 is a schematic diagram of an interface output to a user in a process of associating a two-dimensional code with a goods batch according to the embodiments of this disclosure;

DETAILED DESCRIPTION

Embodiments of this disclosure provide a two-dimensional code initialization method and apparatus, to increase two-dimensional code initialization efficiency.

Figure 1:
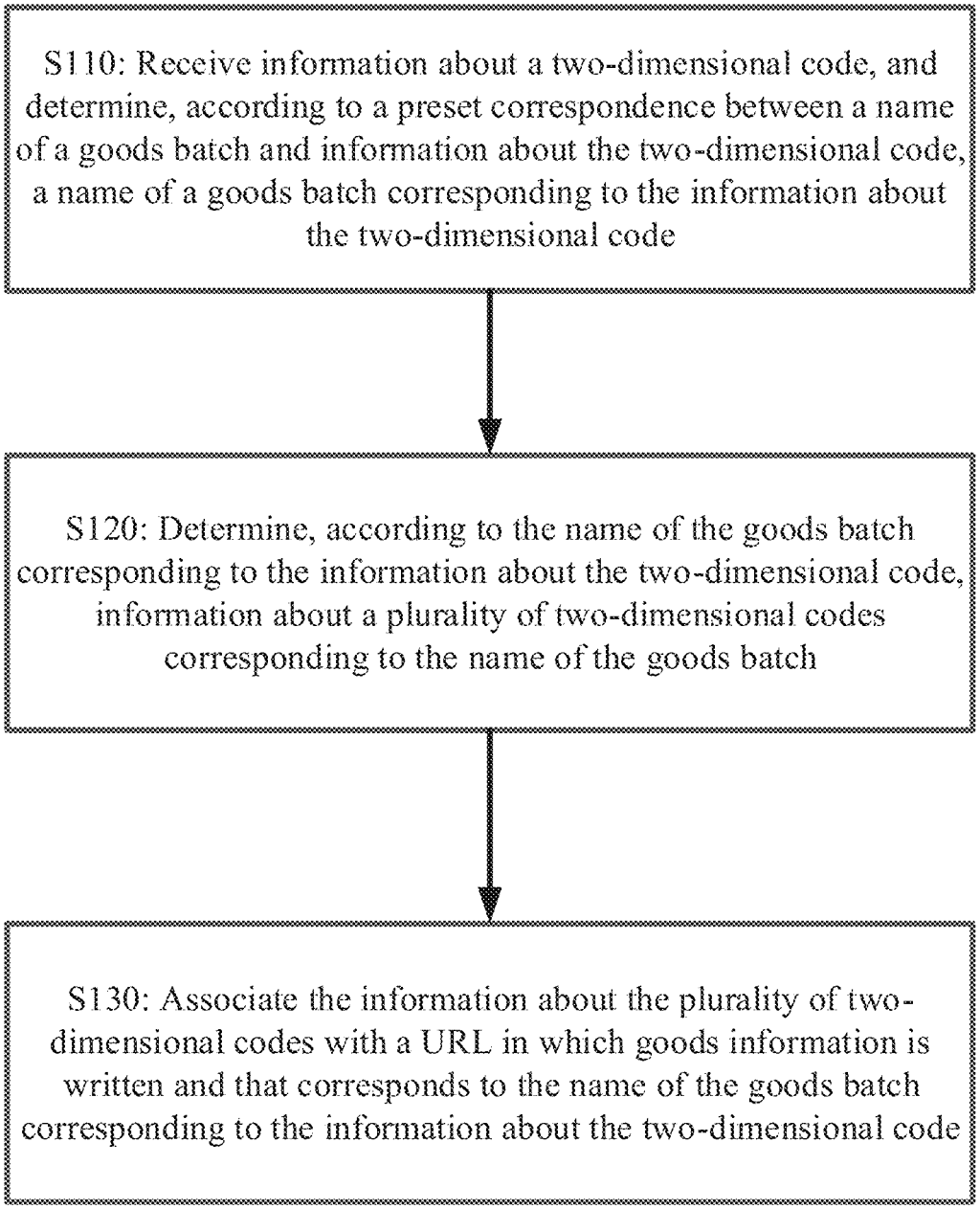
FIG. 1 is a schematic flowchart of a two-dimensional code initialization method according to the embodiments of this disclosure.

Referring to FIG. 1, a two-dimensional code initialization method provided in an embodiment of this application includes the following steps:

S101: Receive information about a two-dimensional code, and determine, according to a preset correspondence between a name of a goods batch and information about the two-dimensional code, a name of a goods batch corresponding to the information about the two-dimensional code.

S102: Determine, according to the name of the goods batch corresponding to the information about the two-dimensional code, information about a plurality of two-dimensional codes corresponding to the name of the goods batch.

S103: Associate the information about the plurality of two-dimensional codes with a URL in which goods information is written and that corresponds to the name of the goods batch corresponding to the information about the two-dimensional code.

According to the method, information about any two-dimensional code is received, and a name of a goods batch corresponding to the information about the two-dimensional code is determined according to a preset correspondence between a name of a goods batch and information about the two-dimensional code; information about a plurality of two-dimensional codes corresponding to the name of the goods batch is determined according to the name of the goods batch corresponding to the information about the two-dimensional code; and the information about the plurality of two-dimensional codes is associated with a URL in which goods information is written and that corresponds to the name of the goods batch corresponding to the information about the two-dimensional code. Therefore, information about a plurality of two-dimensional codes corresponding to one goods batch can be associated once with a corresponding URL by using the goods batch as a unit. Compared with the operation of initializing two-dimensional codes one by one in the prior art, the method greatly increases two-dimensional code initialization efficiency.

In addition, in many scenarios in which a two-dimensional code needs to be used, to enable a consumer to clearly understand important information about purchased commercial products, such as manufacturing, transportation, and whether the commercial products are qualified, two-dimensional codes are pasted on these commercial products, for commercial product information traceback. However, in an existing two-dimensional code delivery solution, two-dimensional codes are generated and printed as required, that is, a user side of two-dimensional codes applies for a quantity of two-dimensional codes that are needed. Sometimes, the user side needs to apply for as many two-dimensional codes as possible to prevent shortage of two-dimensional codes, but actually cannot use all the two-dimensional codes, and some two-dimensional codes remain unused, which results in a waste. When the user side needs to apply for two-dimensional codes the next time, application is required again, which is relatively inconvenient, and a provider of the two-dimensional codes needs to perform typesetting and printing for multiple times, causing the printing costs to become relatively high.

In some embodiments, based on a solution of massive printing and requirement-based allocation, the provider of the two-dimensional codes may print a relatively large quantity of two-dimensional codes at one time, and allocates the two-dimensional codes to different demand sides according to requirements, so that the printing costs can be effectively reduced, and work efficiency can be increased. The exemplary technical solutions are as follows:

Optionally, the correspondence between the name of the goods batch and the information about the two-dimensional code is preset in the following manner:

receiving a name that is of a goods batch and that is entered by a user;

receiving information that is about a starting two-dimensional code in a volume of two-dimensional codes and that is entered by the user;

outputting an association manner for the user to select; and when an association manner selected by the user is entire-volume association (that is, associating the goods batch with the entire volume of the two-dimensional codes), determining a sequence number of another two-dimensional code in the volume in accordance with a preset sequence number allocation rule of the two-dimensional codes in the volume and in accordance with a sequence number of the starting two-dimensional code, determining information about the another two-dimensional code in the volume in accordance with a preset correspondence between a sequence number of a two-dimensional code and information about the two-dimensional code and in accordance with the sequence number of the another two-dimensional code in the volume, and establishing a correspondence between the goods batch and information for all two-dimensional codes in the volume.

Therefore, in some embodiments, based on a pre-recorded rule of allocating sequence numbers of two-dimensional codes in each volume and according to a sequence number of a starting two-dimensional code in a volume, a correspondence between a goods batch and information about all two-dimensional codes in the volume may be established at a time.

Optionally, the correspondence between the name of the goods batch and the information about the two-dimensional code is preset in the following manner:

receiving a name that is of a goods batch and that is entered by a user;

receiving information that is about a starting two-dimensional code in a volume of two-dimensional codes and that is entered by the user;

outputting an association manner for the user to select; and when an association manner selected by the user is partial association inside the volume, receiving information that is about an ending two-dimensional code in the volume of two-dimensional codes and that is entered by the user, determining a sequence number of a two-dimensional code between the starting two-dimensional code and the ending two-dimensional code in the volume in accordance with a preset sequence number allocation rule of the two-dimensional codes in the volume and in accordance with a sequence number of the starting two-dimensional code, determining information about the two-dimensional code between the starting two-dimensional code and the ending two-dimensional code in the volume in accordance with a preset correspondence between a sequence number of a two-dimensional code and information about the two-dimensional code and in accordance with the sequence number of the two-dimensional code between the starting two-dimensional code and the ending two-dimensional code in the volume, and establishing a correspondence between the goods batch and information about the starting two-dimensional code to the ending two-dimensional code in the volume.

Therefore, in some embodiments, based on a pre-recorded rule of allocating sequence numbers of two-dimensional codes in each volume and according to a sequence number of a starting two-dimensional code and a sequence number of an ending two-dimensional code in a volume, a correspondence between a goods batch and information about some two-dimensional codes in the volume may be established at one time. A remaining two-dimensional code of the volume is a blank code, which may be used for a next batch of goods to prevent waste.

Optionally, each volume includes the same quantity of two-dimensional codes.

Optionally, sequence numbers of two-dimensional codes in each volume are consecutive.

Figure 2:
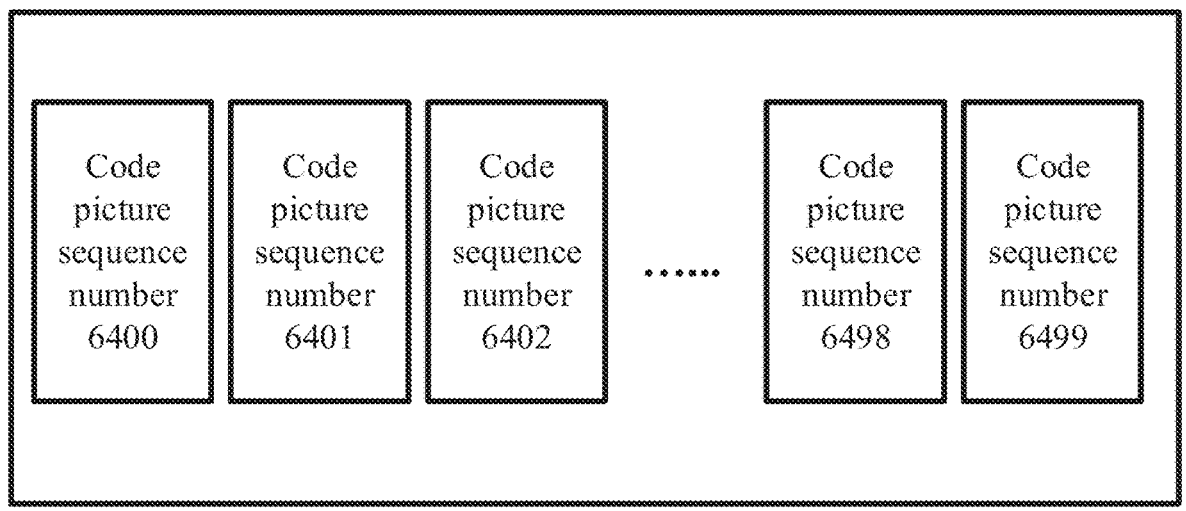
FIG. 2 is a schematic diagram of sequence numbers of two-dimensional codes in a volume of two-dimensional codes according to the embodiments of this disclosure.

In summary, in some embodiments, to reduce costs of printing a small quantity of two-dimensional codes, a generator side of two-dimensional codes generates massive blank codes in advance at one time for printing. These blank codes have corresponding information records in a background database, that is, a correspondence between a picture and a sequence number of each blank code is recorded. Physical printed codes are managed in volumes, as shown in FIG. 2. That is, there is a fixed quantity (such as 100) of two-dimensional code pictures in one volume, and each two-dimensional code picture has its own unique sequence number. This sequence number is associated with a corresponding code record in the database, that is, a correspondence between a picture and a sequence number of each blank code is recorded, and in each volume, two-dimensional code pictures are sorted in a sequence of sequence numbers of the two-dimensional code pictures.

The user side of two-dimensional codes estimates a quantity of codes that will be used by the user side in a period of time, and applies to the provider of two-dimensional codes for the quantity of codes. The provider of two-dimensional codes randomly allocates, according to the smallest quantity of volumes that are applied for, some volumes to an applicant side (or the user side) of two-dimensional codes in small batches from a large quantity of two-dimensional codes generated in advance. A two-dimensional code in each volume of two-dimensional codes has a unique corresponding sequence number, and sequence numbers are sorted according to a predetermined rule. Therefore, the provider of two-dimensional codes can very easily determine which two-dimensional codes are two-dimensional codes that are provided to different applicant sides of two-dimensional codes and quantities of the two-dimensional codes, thereby facilitating maintenance and management of the two-dimensional codes.

Figure 3:
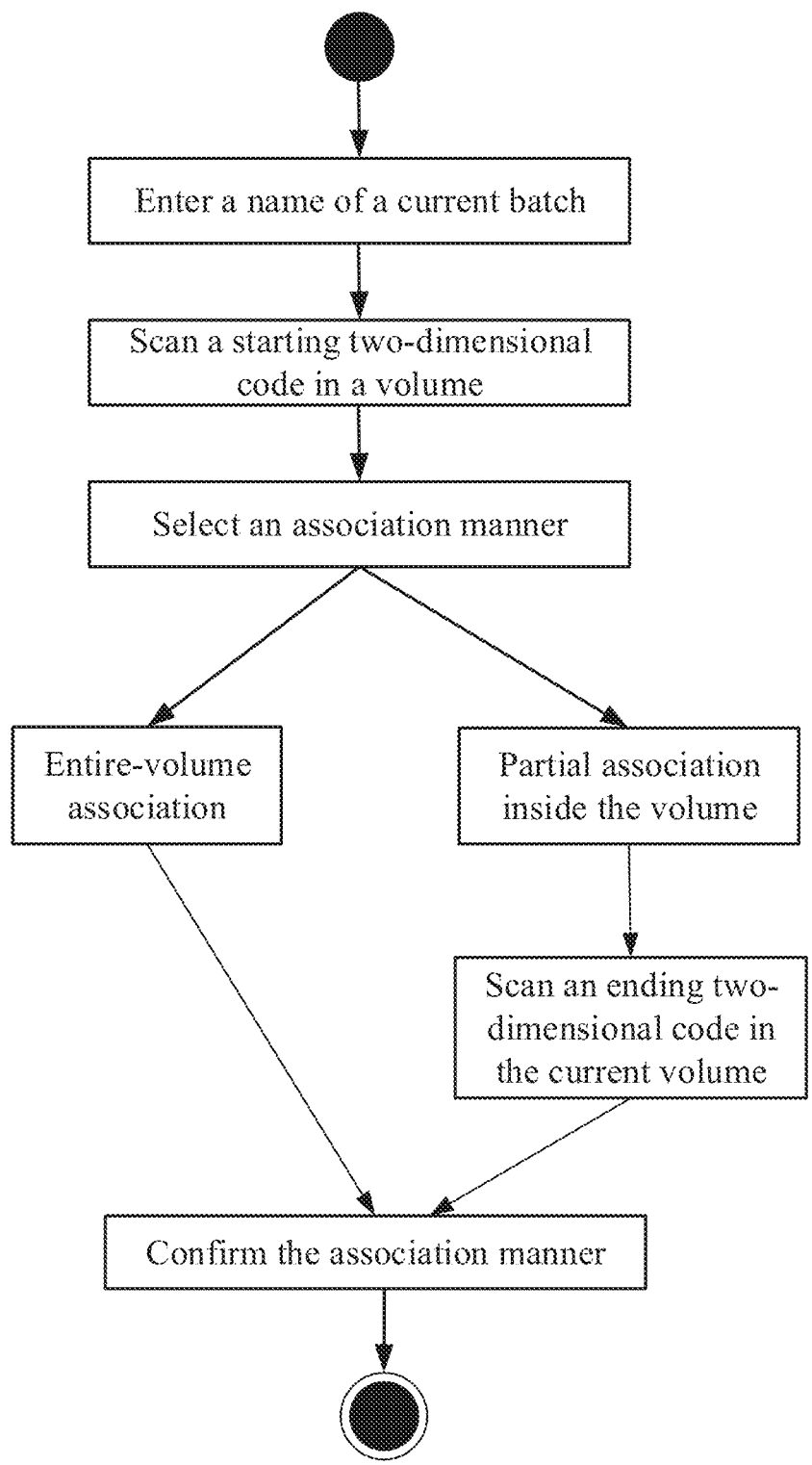
FIG. 3 is a schematic flowchart of associating a two-dimensional code with a goods batch according to the embodiments of this disclosure
Figure 4:
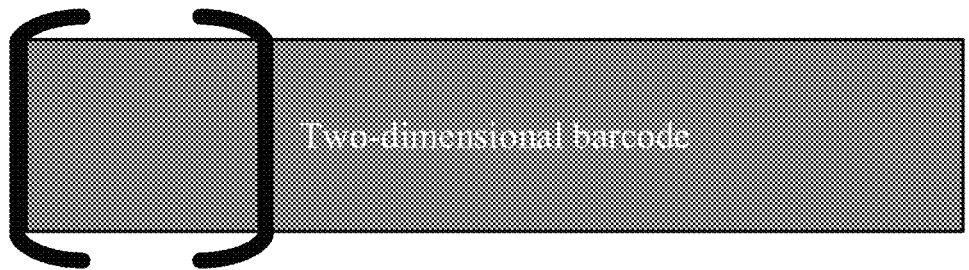
FIG. 4 is a schematic diagram of an interface output to a user in a process of associating a two-dimensional code with a goods batch according to the embodiments of this disclosure.
Figure 4:
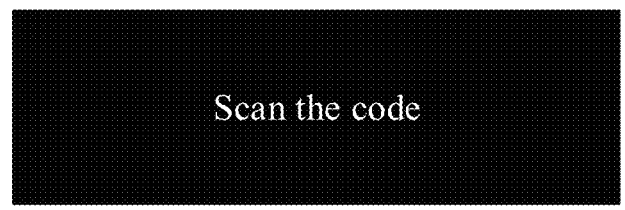

Referring to FIG. 3, various steps of presetting the correspondence between the name of the goods batch and the information about the two-dimensional code include:

entering a name of a current goods batch; and scanning a starting two-dimensional code in a volume, where an interface provided to the user in this step is shown in FIG. 4; the user may start scanning a two-dimensional code by clicking a code scanning button, and record the scanned two-dimensional code as the starting two-dimensional code of the volume; and selecting an association manner, where an interface provided to the user in this step is shown in FIG. 5; if the user wants entire-volume association, the user may click an entire-volume association button; or if the user wants partial association inside the volume, the user may click an association button for specifying an ending two-dimensional code; sequence numbers of two-dimensional codes in each volume are consecutive, and each volume has a fixed quantity of two-dimensional codes, and therefore, it is very easy to associate an entire volume or some consecutive two-dimensional codes with one goods batch according to a rule of the sequence numbers of the two-dimensional codes, and the background database correspondingly records which two-dimensional codes are associated with which goods batch.

If the association manner is entire-volume association, a sequence number of another two-dimensional code in the volume is determined in accordance with a preset sequence number allocation rule of the two-dimensional codes in the volume and according to a sequence number of the starting two-dimensional code, information about the another two-dimensional code in the volume is determined in accordance with a preset correspondence between a sequence number of a two-dimensional code and information about the two-dimensional code and according to the sequence number of the another two-dimensional code in the volume, and a correspondence between the goods batch and information about all two-dimensional codes in the volume is established.

If the association manner is partial association inside the volume, information that is about an ending two-dimensional code in the volume of two-dimensional codes and that is entered by the user is received, a sequence number of a two-dimensional code between the starting two-dimensional code and the ending two-dimensional code in the volume is determined in accordance with a preset sequence number allocation rule of the two-dimensional codes in the volume and in accordance with a sequence number of the starting two-dimensional code, information about the two-dimensional code between the starting two-dimensional code and the ending two-dimensional code in the volume is determined in accordance with a preset correspondence between a sequence number of a two-dimensional code and information about the two-dimensional code and in accordance with the sequence number of the two-dimensional code between the starting two-dimensional code and the ending two-dimensional code in the volume, and a correspondence between the goods batch and information about the starting two-dimensional code to the ending two-dimensional code in the volume is established.

Optionally, the method further includes:

associating, according to an instruction of a user, the received information about the two-dimensional code with a URL of which goods information is blank, or with a page that has information prompting that goods information is erroneous. Therefore, when a staff member finds, through checking, that actual goods are not qualified, that is, do not comply with goods information entered in a URL, the staff member may associate the two-dimensional code with the URL of which goods information is blank, or with the page that has information prompting that goods information is erroneous.

Figure 6:
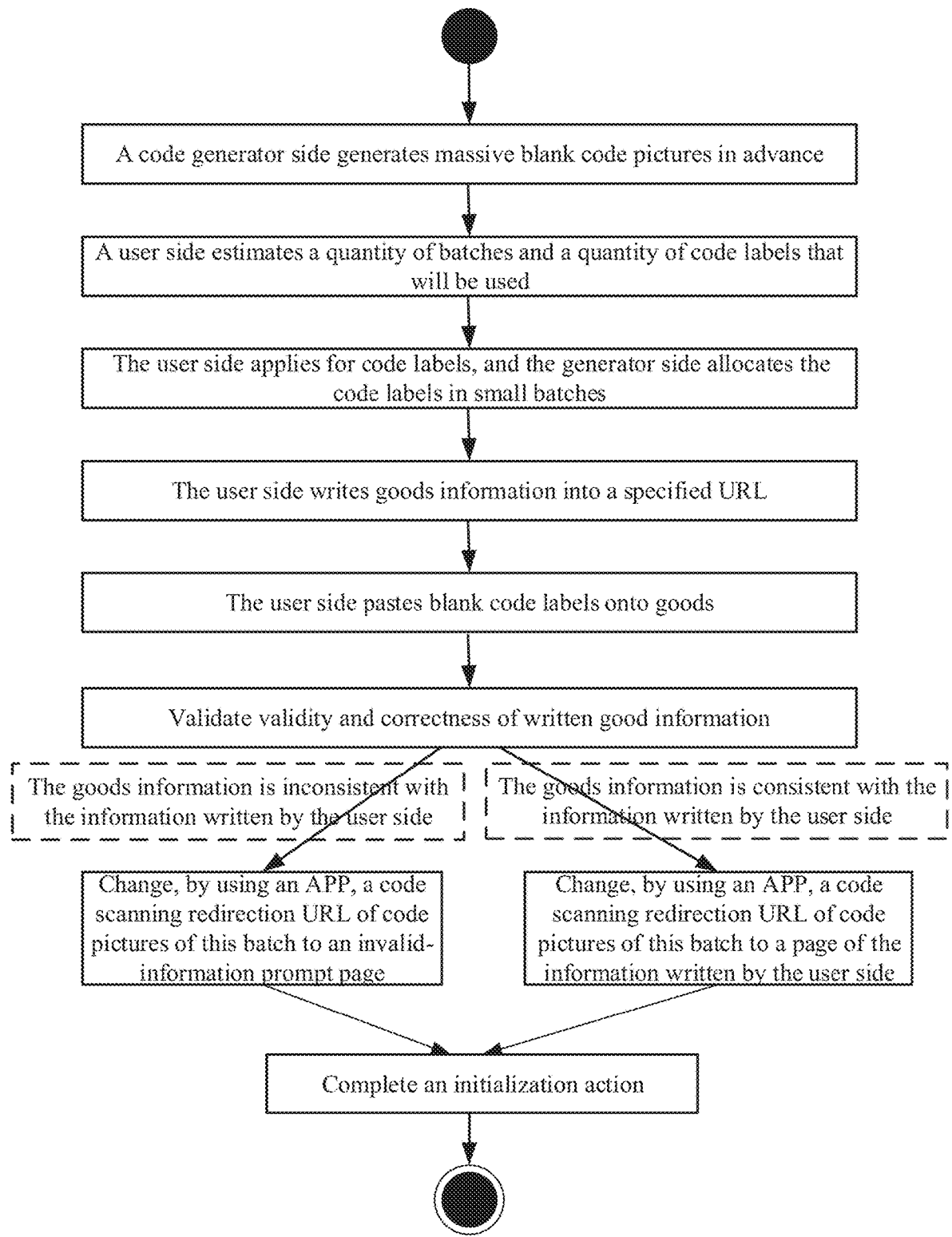
FIG. 6 is an exemplary schematic flowchart of two-dimensional code application and initialization according to the embodiments of this disclosure.

In summary, referring to FIG. 6, an exemplary procedure of two-dimensional code application and initialization includes:

The generator side (or the provider side) of two-dimensional codes generates massive blank code pictures in advance.

The user side (generally the goods provider) of two-dimensional codes estimates a quantity of goods batches and a quantity of two-dimensional codes that will be used.

The user side of two-dimensional codes applies for two-dimensional codes, and the generator side of two-dimensional codes allocates two-dimensional codes to the user side of two-dimensional codes according to a quantity of two-dimensional codes applied for by the user side of two-dimensional codes.

The user side of two-dimensional codes writes goods information into a specified URL.

The user side of two-dimensional codes pastes blank codes onto goods.

A validation side (which may be a third party, or may be the generator side of two-dimensional codes) tests the goods, that is, validates validity and correctness of goods information written into the specified URL. After the correctness of the information written into the specified URL is validated for this batch of goods, a validation person scans any two-dimensional code in this goods batch by using an initialization APP, to learn of a name of the current batch by searching the database. A system automatically counts, by using a batch name as a dimension, a quantity of codes associated with the current batch. Further validation may be performed on the quantity of codes together with an actual goods production, to check rationality of code use (to prevent the codes from being abused). After all information is correct, a code scanning redirection URL of the two-dimensional codes associated with this batch is changed, by using the initialization APP through one click, to the URL address in which information is previously recorded. In this way, a blank code initialization action is completed. If information is not all correct, a code scanning redirection URL of the two-dimensional codes associated with this batch is kept blank, or a code scanning redirection URL of the two-dimensional codes associated with this batch is redirected to a page that has prompt information. That is:

if the goods information written into the specified URL does not comply with actual goods information, the received information about the two-dimensional code is associated, according to an instruction of a user, with a URL of which goods information is blank, or with a page that has information prompting that the goods information is erroneous; and therefore, when a staff finds, through checking, that actual goods are not qualified, that is, do not comply with goods information entered in a URL, the staff may associate the two-dimensional code with the URL of which goods information is blank, or with the page that has information prompting that goods information is erroneous; or if the goods information written into the specified URL is consistent with actual goods information, information about any two-dimensional code is received, and a name of a goods batch corresponding to the information about the two-dimensional code is determined according to a preset correspondence between a name of a goods batch and information about the two-dimensional code; information about a plurality of two-dimensional codes corresponding to the name of the goods batch is determined according to the name of the goods batch corresponding to the information about the two-dimensional code; and the information about the plurality of two-dimensional codes is associated with a URL in which goods information is written and that corresponds to the name of the goods batch corresponding to the information about the two-dimensional code.

Figure 7:
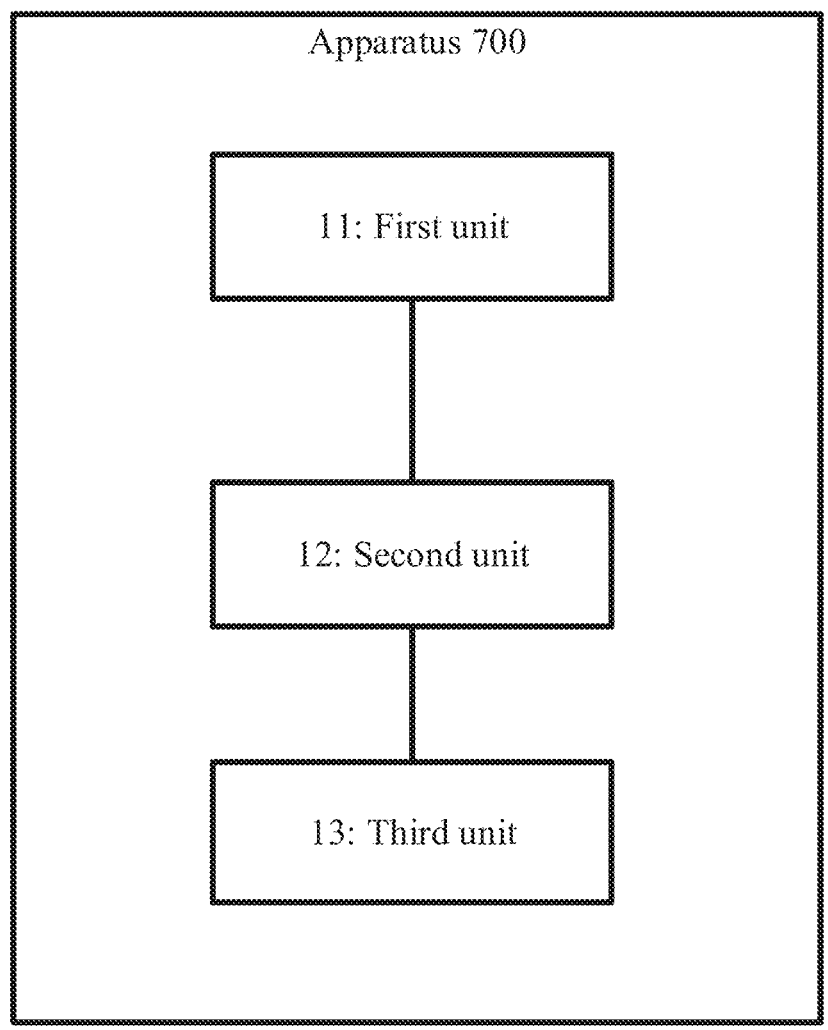
FIG. 7 is a schematic structural diagram of a two-dimensional code initialization apparatus according to the embodiments of this disclosure.

Corresponding to the foregoing method, referring to FIG. 7, a two-dimensional code initialization apparatus 700 provided in an embodiment of this application includes:

a first unit 11, configured to: receive information about a two-dimensional code, and determine, according to a preset correspondence between a name of a goods batch and information about the two-dimensional code, a name of a goods batch corresponding to the information about the two-dimensional code;

a second unit 12, configured to determine, according to the name of the goods batch corresponding to the information about the two-dimensional code, information about a plurality of two-dimensional codes corresponding to the name of the goods batch; and a third unit 13, configured to associate the information about the plurality of two-dimensional codes with a URL in which goods information is written and that corresponds to the name of the goods batch corresponding to the information about the two-dimensional code.

Optionally, the first unit presets the correspondence between the name of the goods batch and the information about the two-dimensional code in the following manner:

receiving a name that is of a goods batch and that is entered by a user;

receiving information that is about a starting two-dimensional code in a volume of two-dimensional codes and that is entered by the user;

outputting an association manner for the user to select; and when an association manner selected by the user is entire-volume association, determining a sequence number of another two-dimensional code in the volume in accordance with a preset sequence number allocation rule of the two-dimensional codes in the volume and according to a sequence number of the starting two-dimensional code, determining information about the another two-dimensional code in the volume in accordance with a preset correspondence between a sequence number of a two-dimensional code and information about the two-dimensional code and according to the sequence number of the another two-dimensional code in the volume, and establishing a correspondence between the goods batch and information about all two-dimensional codes in the volume.

Optionally, the first unit presets the correspondence between the name of the goods batch and the information about the two-dimensional code in the following manner:

receiving a name that is of a goods batch and that is entered by a user;

receiving information that is about a starting two-dimensional code in a volume of two-dimensional codes and that is entered by the user;

outputting an association manner for the user to select; and when an association manner selected by the user is partial association inside the volume, receiving information that is about an ending two-dimensional code in the volume of two-dimensional codes and that is entered by the user, determining a sequence number of a two-dimensional code between the starting two-dimensional code and the ending two-dimensional code in the volume in accordance with a preset sequence number allocation rule of the two-dimensional codes in the volume and in accordance with a sequence number of the starting two-dimensional code, determining information about the two-dimensional code between the starting two-dimensional code and the ending two-dimensional code in the volume in accordance with a preset correspondence between a sequence number of a two-dimensional code and information about the two-dimensional code and in accordance with the sequence number of the two-dimensional code between the starting two-dimensional code and the ending two-dimensional code in the volume, and establishing a correspondence between the goods batch and information about the starting two-dimensional code to the ending two-dimensional code in the volume.

Optionally, each volume includes the same quantity of two-dimensional codes.

Optionally, sequence numbers of two-dimensional codes in each volume are consecutive.

Optionally, the third unit is further configured to associate, according to an instruction of a user, the received information about the two-dimensional code with a URL of which goods information is blank, or with a page that has information prompting that goods information is erroneous.

In some embodiments, the various modules and units of the apparatus 700 may be implemented as software instructions. That is, the apparatus 700 may comprise a processor and a non-transitory computer-readable storage medium storing instructions that, when executed by the processor, cause one or more components of the apparatus 700 (e.g., the processor) to perform various steps and methods of the modules and units described above. The apparatus 700 may also be referred to as a two-dimensional code initialization system. In some embodiments, the apparatus 700 may include a mobile phone, a tablet computer, a PC, a laptop computer, a server, etc.

Any of the foregoing units may be implemented by using a physical device such as a processor. The processor may be a central processing unit (CPU), an application-specific integrated circuit (ASIC), a field-programmable gate array (FPGA), or a complex programmable logic device (CPLD).

The embodiments of this disclosure may be provided as methods, systems, or computer program products. Therefore, this disclosure may take the form of hardware-only embodiments, software-only embodiments, or embodiments combining software and hardware. In addition, this disclosure may use a form of a computer program product implemented on one or more computer available storage media (including but not limited to a disk memory, an optical memory, and the like) including computer available program code.

This disclosure is described with reference to flowcharts and/or block diagrams of the method, the device (the system), and the computer program product in the embodiments of this disclosure. Computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art may make various modifications and variations on this disclosure, without departing from the spirit and scope of this disclosure. In this way, if these modifications and variations on this disclosure fall within the scope of the claims of this disclosure and an equivalent technology thereof, this disclosure is intended to include these modifications and variations.

What is claimed is:

1. A two-dimensional code initialization method, wherein the method comprises:
   obtaining a two-dimensional code;
   determining, according to a preset-correspondence between a name of a goods batch and the two-dimensional code, a particular name of the goods batch corresponding to the two-dimensional code;
   determining, according to the particular name of the goods batch corresponding to the two-dimensional code, a plurality of two-dimensional codes corresponding to the particular name of the goods batch; and
   in a database, associating in a batch the plurality of two-dimensional codes with a URL (Uniform Resource Locator) in which goods information is written and that corresponds to the particular name of the goods batch, wherein scanning one of the plurality of two-dimensional codes indicates the goods information.

2. The method according to claim 1, wherein the correspondence between the particular name of the goods batch and the two-dimensional code is preset in the following manner:
   receiving a name that is of the goods batch and that is entered by a user;
   receiving information that is about a starting two-dimensional code in a volume of two-dimensional codes and that is entered by the user;
   outputting an association manner for the user to select; and
   when an association manner selected by the user is entire-volume association, determining a sequence number of another two-dimensional code in the volume in accordance with a preset sequence number allocation rule of the two-dimensional codes in the volume and in accordance with a sequence number of the starting two-dimensional code, determining the another two-dimensional code in the volume in accordance with a preset correspondence between a sequence number of a two-dimensional code and the two-dimensional code and in accordance with the sequence number of the another two-dimensional code in the volume, and establishing a correspondence between the goods batch and all two-dimensional codes in the volume.

3. The method according to claim 2, wherein each volume comprises a same quantity of two-dimensional codes.

4. The method according to claim 2, wherein sequence numbers of two-dimensional codes in each volume are consecutive.

5. The method according to claim 1, wherein the correspondence between the particular name of the goods batch and the two-dimensional code is preset in the following manner:
receiving a name that is of the goods batch and that is entered by a user;
receiving information that is about a starting two-dimensional code in a volume of two-dimensional codes and that is entered by the user;
outputting an association manner for the user to select; and
when an association manner selected by the user is partial association inside the volume, receiving information that is about an ending two-dimensional code in the volume of two-dimensional codes and that is entered by the user, determining a sequence number of a two-dimensional code between the starting two-dimensional code and the ending two-dimensional code in the volume in accordance with a preset sequence number allocation rule of the two-dimensional codes in the volume and in accordance with a sequence number of the starting two-dimensional code, determining the two-dimensional code between the starting two-dimensional code and the ending two-dimensional code in the volume in accordance with a preset correspondence between a sequence number of a two-dimensional code and the two-dimensional code and in accordance with the sequence number of the two-dimensional code between the starting two-dimensional code and the ending two-dimensional code in the volume, and establishing a correspondence between the goods batch and the starting two-dimensional code to the ending two-dimensional code in the volume.

6. The method according to claim 1, wherein the method further comprises: associating, according to an instruction of a user, the two-dimensional code with a URL of which goods information is blank.

7. The method according to claim 1, wherein the method further comprises: associating, according to an instruction of a user, the two-dimensional code with a page that has information prompting that goods information is erroneous.

8. A non-transitory computer-readable storage medium, comprising instructions that, when executed by a processor, cause the processor to perform a two-dimensional code initialization method, the method comprising:
obtaining a two-dimensional code;
determining, according to a preset-correspondence between a name of a goods batch and the two-dimensional code, a particular name of the goods batch corresponding to the two-dimensional code;
determining, according to the particular name of the goods batch corresponding to the two-dimensional code, a plurality of two-dimensional codes corresponding to the particular name of the goods batch; and
in a database, associating in a batch the plurality of two-dimensional codes with a URL (Uniform Resource Locator) in which goods information is written and that corresponds to the particular name of the goods batch, wherein scanning one of the plurality of two-dimensional codes indicates the goods information.

9. The non-transitory computer-readable storage medium of claim 8, wherein the correspondence between the particular name of the goods batch and the two-dimensional code is preset in the following manner:
receiving a name that is of the goods batch and that is entered by a user;
receiving information that is about a starting two-dimensional code in a volume of two-dimensional codes and that is entered by the user;
outputting an association manner for the user to select; and
when an association manner selected by the user is entire-volume association, determining a sequence number of another two-dimensional code in the volume in accordance with a preset sequence number allocation rule of the two-dimensional codes in the volume and in accordance with a sequence number of the starting two-dimensional code, determining the another two-dimensional code in the volume in accordance with a preset correspondence between a sequence number of a two-dimensional code and the two-dimensional code and in accordance with the sequence number of the another two-dimensional code in the volume, and establishing a correspondence between the goods batch and all two-dimensional codes in the volume.

10. The non-transitory computer-readable storage medium of claim 9, wherein each volume comprises a same quantity of two-dimensional codes.

11. The non-transitory computer-readable storage medium of claim 9, wherein sequence numbers of two-dimensional codes in each volume are consecutive.

12. The non-transitory computer-readable storage medium of claim 8, wherein the correspondence between the particular name of the goods batch and the two-dimensional code is preset in the following manner:
receiving a name that is of the goods batch and that is entered by a user;
receiving information that is about a starting two-dimensional code in a volume of two-dimensional codes and that is entered by the user;
outputting an association manner for the user to select; and
when an association manner selected by the user is partial association inside the volume, receiving information that is about an ending two-dimensional code in the volume of two-dimensional codes and that is entered by the user, determining a sequence number of a two-dimensional code between the starting two-dimensional code and the ending two-dimensional code in the volume in accordance with a preset sequence number allocation rule of the two-dimensional codes in the volume and in accordance with a sequence number of the starting two-dimensional code, determining the two-dimensional code between the starting two-dimensional code and the ending two-dimensional code in the volume in accordance with a preset correspondence between a sequence number of a two-dimensional code and the two-dimensional code and in accordance with the sequence number of the two-dimensional code between the starting two-dimensional code and the ending two-dimensional code in the volume, and establishing a correspondence between the goods batch and the starting two-dimensional code to the ending two-dimensional code in the volume.

13. The non-transitory computer-readable storage medium of claim 8, wherein the method further comprises: associating, according to an instruction of a user, the two-dimensional code with a URL of which goods information is blank.

14. The non-transitory computer-readable storage medium of claim 8, wherein the method further comprises: associating, according to an instruction of a user, the two-dimensional code with a page that has information prompting that goods information is erroneous.

15. A two-dimensional code initialization system, comprising a processor and a non-transitory computer-readable storage medium comprising instructions that, when executed by the processor, cause the processor to perform a two-dimensional code initialization method, the method comprising:
  obtaining a two-dimensional code;
  determining, according to a preset-correspondence between a name of a goods batch and the two-dimensional code, a particular name of the goods batch corresponding to the two-dimensional code;
  determining, according to the particular name of the goods batch corresponding to the two-dimensional code, a plurality of two-dimensional codes corresponding to the particular name of the goods batch; and
  in a database, associating in a batch the plurality of two-dimensional codes with a URL (Uniform Resource Locator) in which goods information is written and that corresponds to the particular name of the goods batch, wherein scanning one of the plurality of two-dimensional codes indicates the goods information.

16. The two-dimensional code initialization system of claim 15, wherein the correspondence between the particular name of the goods batch and the two-dimensional code is preset in the following manner:
  receiving a name that is of the goods batch and that is entered by a user;
  receiving information that is about a starting two-dimensional code in a volume of two-dimensional codes and that is entered by the user;
  outputting an association manner for the user to select; and
  when an association manner selected by the user is entire-volume association, determining a sequence number of another two-dimensional code in the volume in accordance with a preset sequence number allocation rule of the two-dimensional codes in the volume and in accordance with a sequence number of the starting two-dimensional code, determining the another two-dimensional code in the volume in accordance with a preset correspondence between a sequence number of a two-dimensional code and the two-dimensional code and in accordance with the sequence number of the another two-dimensional code in the volume, and establishing a correspondence between the goods batch and all two-dimensional codes in the volume.

17. The two-dimensional code initialization system of claim 16, wherein sequence numbers of two-dimensional codes in each volume are consecutive.

18. The two-dimensional code initialization system of claim 15, wherein the correspondence between the particular name of the goods batch and the two-dimensional code is preset in the following manner:
  receiving a name that is of the goods batch and that is entered by a user;
  receiving information that is about a starting two-dimensional code in a volume of two-dimensional codes and that is entered by the user;
  outputting an association manner for the user to select; and
  when an association manner selected by the user is partial association inside the volume, receiving information that is about an ending two-dimensional code in the volume of two-dimensional codes and that is entered by the user, determining a sequence number of a two-dimensional code between the starting two-dimensional code and the ending two-dimensional code in the volume in accordance with a preset sequence number allocation rule of the two-dimensional codes in the volume and in accordance with a sequence number of the starting two-dimensional code, determining the two-dimensional code between the starting two-dimensional code and the ending two-dimensional code in the volume in accordance with a preset correspondence between a sequence number of a two-dimensional code and the two-dimensional code and in accordance with the sequence number of the two-dimensional code between the starting two-dimensional code and the ending two-dimensional code in the volume, and establishing a correspondence between the goods batch and the starting two-dimensional code to the ending two-dimensional code in the volume.

19. The two-dimensional code initialization system of claim 15, wherein the method further comprises: associating, according to an instruction of a user, the two-dimensional code with a URL of which goods information is blank.

20. The two-dimensional code initialization system of claim 15, wherein the method further comprises: associating, according to an instruction of a user, the two-dimensional code with a page that has information prompting that goods information is erroneous.

* * * * *